US010986772B2

(12) United States Patent
Andres (10) Patent No.: US 10,986,772 B2
(45) Date of Patent: Apr. 27, 2021

(54) WORKING ELEMENT OF AN AGRICULTURAL MACHINE HAVING A SYSTEM FOR ADJUSTING THE DOWN-PRESSURE

(71) Applicant: KUHN S.A., Saverne (FR)

(72) Inventor: Christophe Andres, Waldolwisheim (FR)

(73) Assignee: KUHN S.A., Saverne (FR)

( * ) Notice: Subject to any disclaimer, the term of this patent is extended or adjusted under 35 U.S.C. 154(b) by 379 days.

(21) Appl. No.: 16/077,812

(22) PCT Filed: Feb. 22, 2017

(86) PCT No.: PCT/FR2017/050390
§ 371 (c)(1),
(2) Date: Aug. 14, 2018

(87) PCT Pub. No.: WO2017/144815
PCT Pub. Date: Aug. 31, 2017

(65) Prior Publication Data
US 2020/0053953 A1      Feb. 20, 2020

(30) Foreign Application Priority Data
Feb. 26, 2016   (FR) ...................... 1651595

(51) Int. Cl.
*A01C 7/20*   (2006.01)
*A01B 63/26*  (2006.01)
*A01B 71/02*  (2006.01)

(52) U.S. Cl.
CPC .............. *A01C 7/205* (2013.01); *A01B 63/26* (2013.01); *A01B 71/02* (2013.01)

(58) Field of Classification Search
CPC .......... A01C 7/205; A01B 63/26; A01B 71/02
See application file for complete search history.

(56) References Cited

U.S. PATENT DOCUMENTS

| 4,766,962 A | 8/1988 | Frase |
| 4,895,086 A * | 1/1990 | Tye, III .................... A01C 5/06 |
| | | 111/134 |

(Continued)

FOREIGN PATENT DOCUMENTS

| EP | 1 483 952 A1 | 12/2004 |
| EP | 2 823 701 A1 | 1/2015 |

OTHER PUBLICATIONS

International Search Report dated May 22, 2017, in PCT/FR2017/050390, filed Feb. 22, 2017.

*Primary Examiner* — Alicia Torres
(74) *Attorney, Agent, or Firm* — Oblon, McClelland, Maier & Neustadt, L.L.P.

(57) ABSTRACT

A working element is mounted on an agricultural machine having a deformable connecting structure including upper arms and lower arms. The connecting structure includes a system for adjusting the down-pressure having a movable mechanism and a reference member. The mechanism includes a lever and a resilient member that are articulated about a first axis. The mechanism allows an engaged state in which it is held against the reference member in a working position, subjecting the working element to a down-pressure, and an adjusting state in which it is movable about a lower axis with respect to the reference member. The mechanism includes a second axis about which the lever is pivotable in an intermediate state.

16 Claims, 6 Drawing Sheets

(56) References Cited

U.S. PATENT DOCUMENTS

| | | | | |
|---|---|---|---|---|
| 5,461,995 A | * | 10/1995 | Winterton | A01C 7/006 111/139 |
| 5,555,824 A | * | 9/1996 | Stufflebeam | A01C 7/205 111/61 |
| 5,573,072 A | * | 11/1996 | Evans | A01B 63/26 172/397 |
| 5,601,147 A | * | 2/1997 | Lowe | A01B 63/245 172/624.5 |
| 2004/0256122 A1 | | 12/2004 | Roibier | |
| 2007/0039746 A1 | | 2/2007 | Bettin et al. | |

\* cited by examiner

WORKING ELEMENT OF AN AGRICULTURAL MACHINE HAVING A SYSTEM FOR ADJUSTING THE DOWN-PRESSURE

BACKGROUND

The present invention relates to the general technical field of agricultural machinery, and in particular the field of tilling and/or seeding.

The invention relates to any agricultural machine requiring the application of a down-pressure. A down-pressure is a ballasting force applied to a tool toward the ground in order to promote the interaction between the tool and the ground. The invention for example relates to an agricultural machine 1 like in FIG. 1, which can be a single seeder or precision planter 1A, or a fertilizer distribution machine or a mixed machine. This seeder includes a chassis 2 transverse to the direction of advance, which bears at least one working element 5. The working element 5 here is called sowing element 5A, with the understanding that it could also be a fertilizer distribution element, a mixed seed and fertilizer distribution element or a tool for working the ground. The sowing element 5A has a connecting structure 7 via which it is mounted on a beam 6 of the chassis 2. The connecting structure 7 includes at least an upper arm 17 and a lower arm 18. The connecting structure 7 also includes a clamp 13 and a fastener 15 each allowing the connection of each of the two arms 17 and 18 both with the beam 6 and the sowing element 5A.

Figure 1:
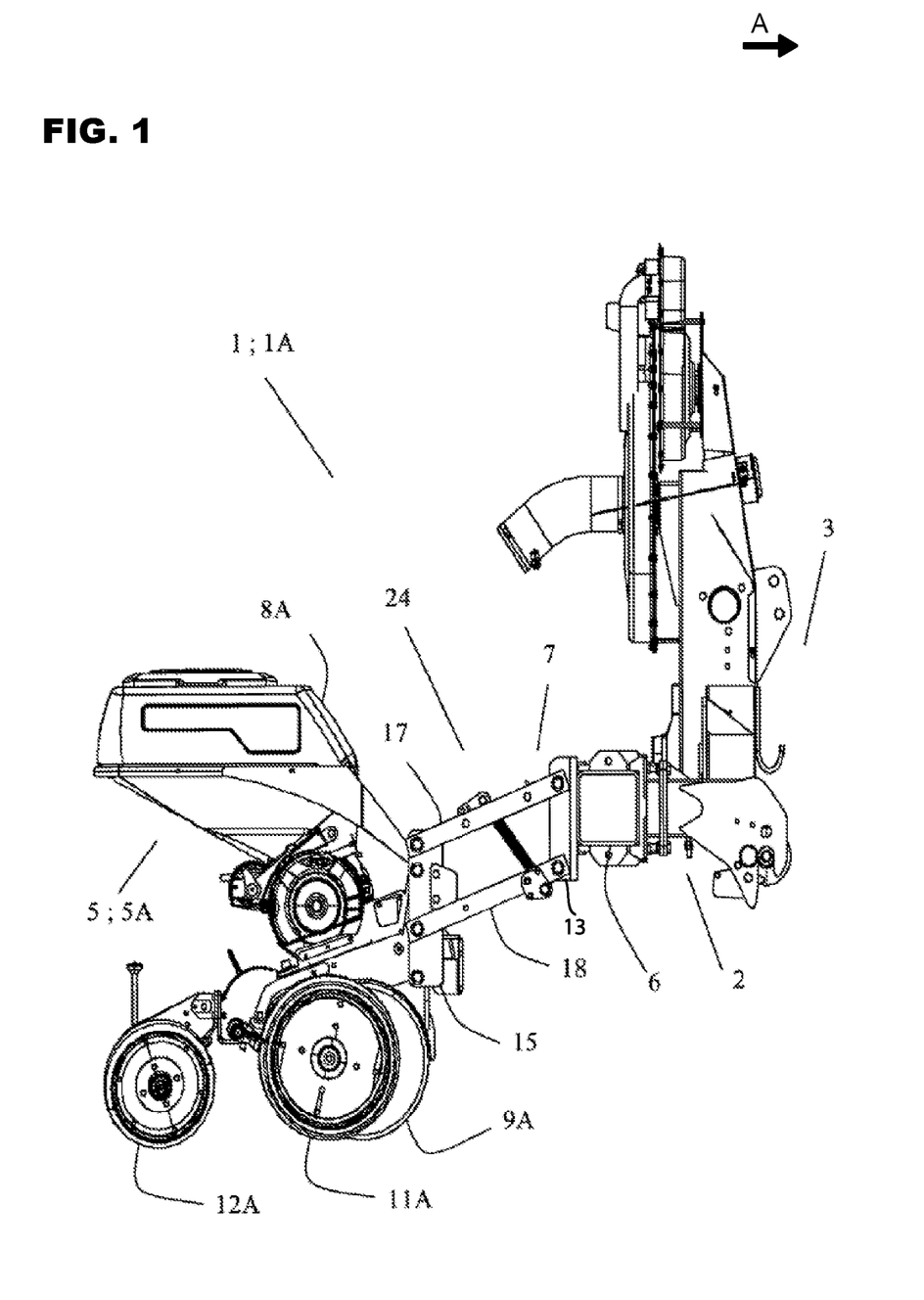
FIG. 1 is a side view of a known precision planter.

The sowing element 5A serves to form the furrow and to convey the seeds therein from a hopper 8A. In order to guarantee proper germination of the seeds, each species must be placed at an appropriate depth. To that end, the connecting structure 7 is provided with a system for adjusting the down-pressure 24 making it possible to apply a downward force on the sowing element 5A in order to maintain a constant planting depth of the seeds. Opening discs 9A are provided to open the furrow, followed by side furrow wheels 11A to control the sowing depth, i.e., to prevent excessive pushing in of the sowing element. Lastly, tamping wheels 12A close the furrow and reinforce the contact between the seeds and the ground.

Such an adjusting system is for example known from document EP 1,483,952 A1. In this document, the adjusting system includes an adjusting handle mounted on springs. The adjusting handle includes three rods and three plates assembled to one another and forming a whole. The three rods are mounted parallel to one another and are each fastened to the three plates and perpendicular thereto. The rods form, strictly speaking, the gripping part of the handle.

In reference to FIG. 5 of document EP 1,483,952 A1, a first rod rests on the pair of upper arms and serves as rotation axis for the handle. The second and third rods are arranged behind the first relative to the direction of advance of the machine. The second rod engages in the indentations of the rack to lock the handle in position and impose a given down-pressure on the sowing element, i.e., also the engagement depth in the ground. The third rod essentially offers grip to the user to tilt the handle. A locking device is provided to keep the handle in position in the rack. Lastly, the springs are mounted rotatably on an axis connected to the pair of lower arms.

In this system, the length of the springs is determined when the machine is raised, the working element is in the lower position and the upper arms are therefore as close as possible to the lower arms, i.e., when the handle is engaged in the indentation of the rack furthest to the back and the sowing element is in the low position. The down-pressure applied to the sowing element is then maximal. By bringing the handle closer to the front of the machine, it is possible to decrease the applied down-pressure. This adjusting system, however, has a relatively low down-pressure in the forward position, which requires locking the handle against the rack using a pin, failing which the system risks disengaging.

Another known system for adjusting the down-pressure has a slide able to slide on the upper arms and on which springs are mounted connected to the lower arms. The slide has side pins that one engages as needed in housings provided in the upper arms. The springs greatly oppose the movement of the slide against the upper arms and adjusting them is tedious.

A third known system has a non-tilting handle, directly mounted on pressure springs. Here, the adjustment is done by pulling the handle in the axis of the springs to disengage the working position. This system offers a limited down-pressure, since the user must be able to offset this force directly by adjustment.

Furthermore, the agricultural machines of the type described above have a large number of working elements arranged next to one another. Access to the working elements is cramped and complicates adjustments for the user.

BRIEF SUMMARY

The present invention aims to resolve the aforementioned drawbacks. It thus in particular proposes an improved working element for an agricultural machine, having a system for adjusting the down-pressure that has a simple design, is cost-effective and is easy to use.

The invention thus relates to a working element of an agricultural machine intended to be mounted on a substantially horizontal beam of the machine using a deformable connecting structure including at least one upper arm and at least one lower arm, said connecting structure comprising an adjusting system having a movable mechanism and a reference member, the movable mechanism comprising a lever and a resilient member, the lever being mounted rotatably relative to the resilient member about a first axis, the movable mechanism allowing:

- an engaged state in which the movable mechanism is held against the reference member, the engaged state allowing at least one working position in which the adjusting system applies a down-pressure to the working element; and
- an adjusting state, in which the movable mechanism is movable relative to the reference member about a lower axis.

In the working element according to the invention, the movable mechanism comprises a second axis different from the first axis, and in which the movable mechanism allows an intermediate state in which the lever is rotatable about the second axis.

Thus, a load transfer occurs between the two axes from and toward the engaged state. It is thus possible to guarantee the automatic locking of the adjusting system when the movable mechanism is in the engaged state or when it is approaching the engaged state through the application of a return stress on an axis different from that about which a lever pivots.

According to one advantageous feature, in the intermediate state, when the first axis is on a first side of a plane passing through the lower axis and through said second axis, the resilient member stresses the lever toward the engaged state, in one of the working positions of the mechanism. Preferably, the first side is the front side.

According to one advantageous feature, in the intermediate state, when the first axis is on a second side of a plane passing through the lower axis and through said second axis, the resilient member stresses the lever toward the adjusting state. Preferably, the second side is the rear side.

Advantageously, in the adjusting state, the resilient member has a constant adjusting length and is rotatable about the lower axis.

Thus, in the adjusting state, the resilient member behaves like a connecting rod and the adjusting system can be adjusted without rubbing on the upper arms and without having to manually oppose elongation force of the resilient member. The adjustment of the down-pressure therefore requires little effort by the user while guaranteeing significant pressure on the working element.

According to one advantageous feature, a support of the resilient member is provided with a stop adjusting member, the adjusting length of the resilient member being determined by the position of the stop adjusting member. Thus, the resilient member can include a tower in which the stop adjusting member is mounted. An end surface of an opposite tower can then come into contact against the stop adjusting member.

According to one particular advantageous configuration, the support and a pivot each include a bore and the stop adjusting member is adjustable by inserting a corresponding tool into the bore when the latter are aligned. The bores are for example aligned when the machine is raised and the adjusting system is in the neutral position. The stop can then be adjusted simply, for example using a screwdriver with an appropriate width.

Particularly advantageously, the lower support and the lower pivot have these bores. The access to the stop member is hidden below the machine and prevents any inadvertent disruption to the settings by an unqualified person.

Alternatively, the upper support and the upper pivot have these bores.

According to one advantageous feature, the resilient member includes a helical spring.

The spring can have a solid length in the adjusting state. This is in particular advantageous when the adjusting system has no separate stop adjusting member. The spring itself in its contracted state serves as a stop for the adjusting system.

The spring may also not have a solid length in the adjusting state. This is the case when a stop adjusting member is provided. The spring is then provided to be shorter than the minimum length of the resilient member. Thus, the resilient member is prestressed and guarantees the application of a significant down-pressure irrespective of the working position assumed by the movable mechanism.

Advantageously, in the engaged state, the movable mechanism can also assume a neutral position in which the movable mechanism is held against the reference member by the resilient element without the adjusting system applying a down-pressure to the working element.

This feature makes it possible to limit or avoid bundling of the adjusting system in the neutral position.

The invention also relates to an agricultural machine comprising a working element comprising at least some of the features described above.

BRIEF DESCRIPTION OF THE DRAWINGS

Other features and advantages of the invention will emerge from non-limiting example embodiments of the invention that will follow and the appended drawings, in which.

DETAILED DESCRIPTION

The working element 5A illustrated in FIG. 1 can advantageously be replaced by a working element 30 (FIG. 2) having a connecting structure 31 of a new type. The connecting structure 31 comprises a system for adjusting the down-pressure 34, more simply called adjusting system 34 and described in reference to FIGS. 2 to 6 and 7a to 7c.

The working element 30 and the connecting structure 31 can advantageously be implemented in a seeder like the seeder 1A illustrated in FIG. 1. The seeder 1A is hitched to a tractor, not shown. The seeder 1A can be pulled, semi-carried or carried.

The connecting structure 31 can generally be implemented in any agricultural machine in which the interactions between the working tools can require the application of a down-pressure. This agricultural machine may non-limitingly be of the single seeder, strip-till, or other type of sowing or tilling machine.

Figure 2:
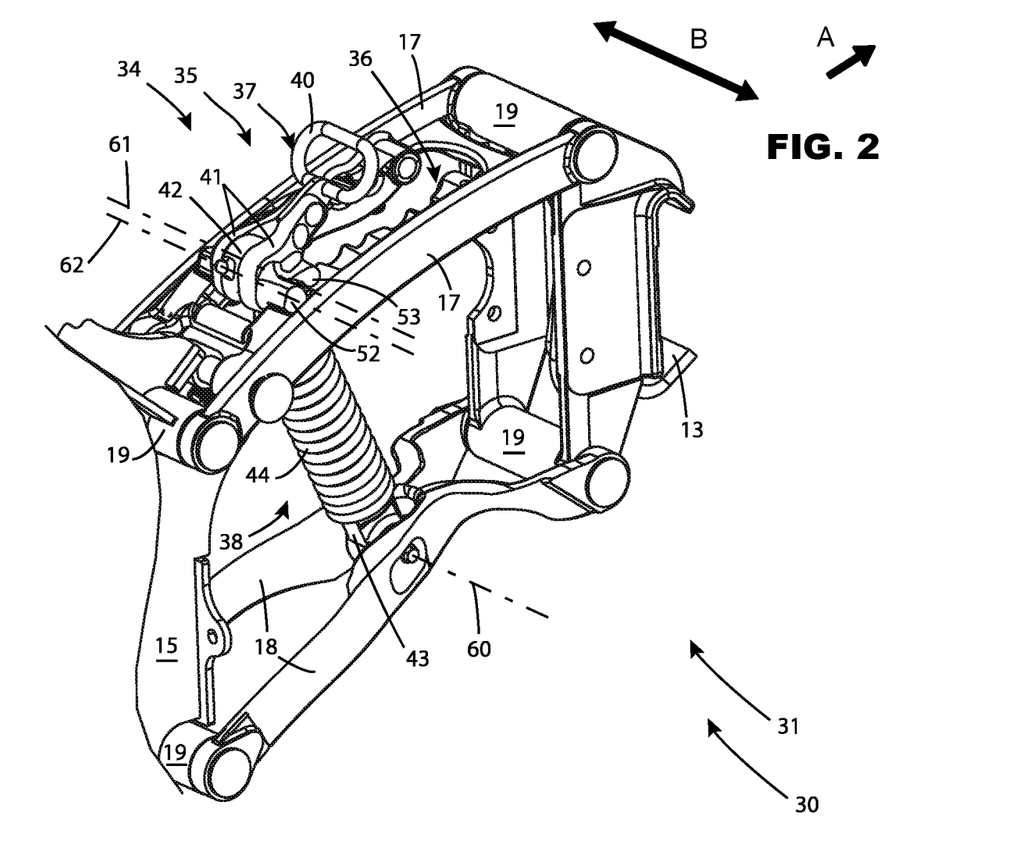
FIG. 2 is a perspective view of a first embodiment of the connecting structure of a sowing element, provided with a down-pressure adjusting system according to the invention.
Figure 7A:
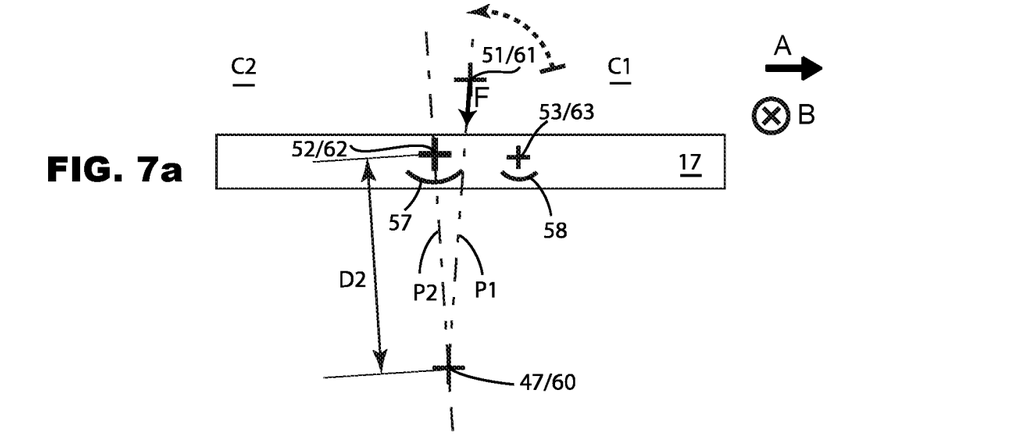
FIGS. 7a, 7b and 7c are diagrams illustrating a pin, a lug and a hinge pin of the adjusting system of FIG. 2 in an engaged state, an intermediate state and an adjusting state.
Figure 7B:
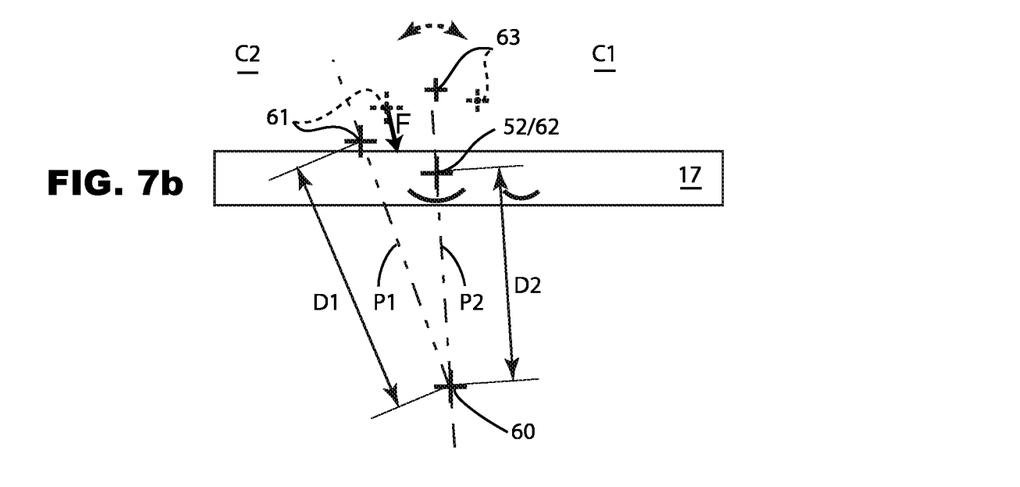
Figure 7C:
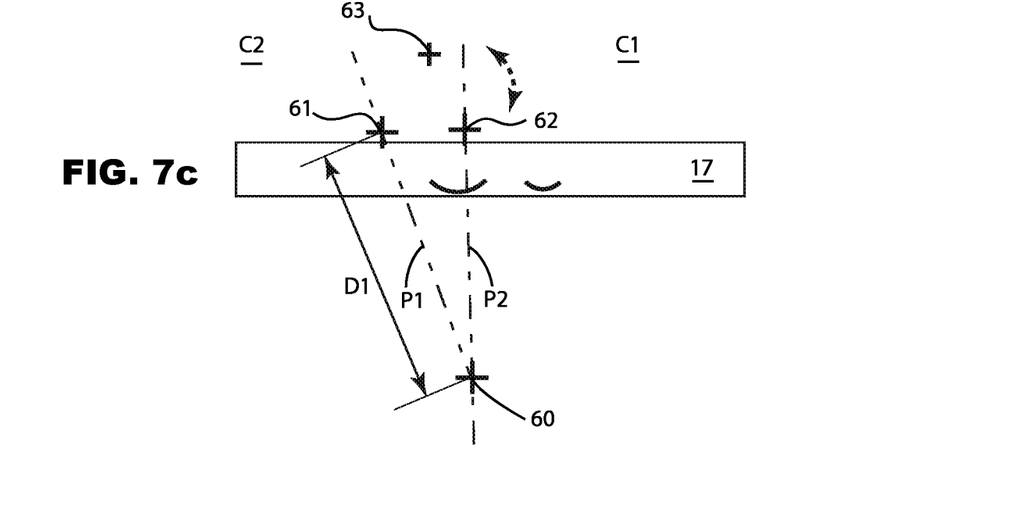

In the Figures, an arrow A represents the general direction of advance of the machine or the orientation of the machine from back to front when it is stopped. A double arrow B, called direction B, in FIG. 2 is oriented horizontally and transversely to the orientation of A, and illustrates the orientation of a certain number of axes described hereinafter. In FIG. 7a, the direction B is perpendicular to the plane of the Figure. The elements shared between FIGS. 7a to 7c are illustrated relative to the same vertical and horizontal orientations.

As shown in FIG. 2, the connecting structure 31 here has a pair of upper arms 17 substantially parallel to one another and a pair of lower arms 18 also substantially parallel to one another. The connecting structure 31 also includes a clamp 13 in front and a fastener 15 in the rear. The arms 17 or 18 are mounted at each of their ends on the clamp 13 and on the fastener 15 by a respective transverse pivot 19. Each pivot 19 also connects the ends of the pairs of arms 17 or 18 located on a same side to one another. There are therefore four pivots 19. Seen from the side, the four pivots 19 form a parallelogram structure (for example, see FIG. 3). In practice, the pairs of arms 17 or 18 are respectively formed in a single piece.

Figure 3:
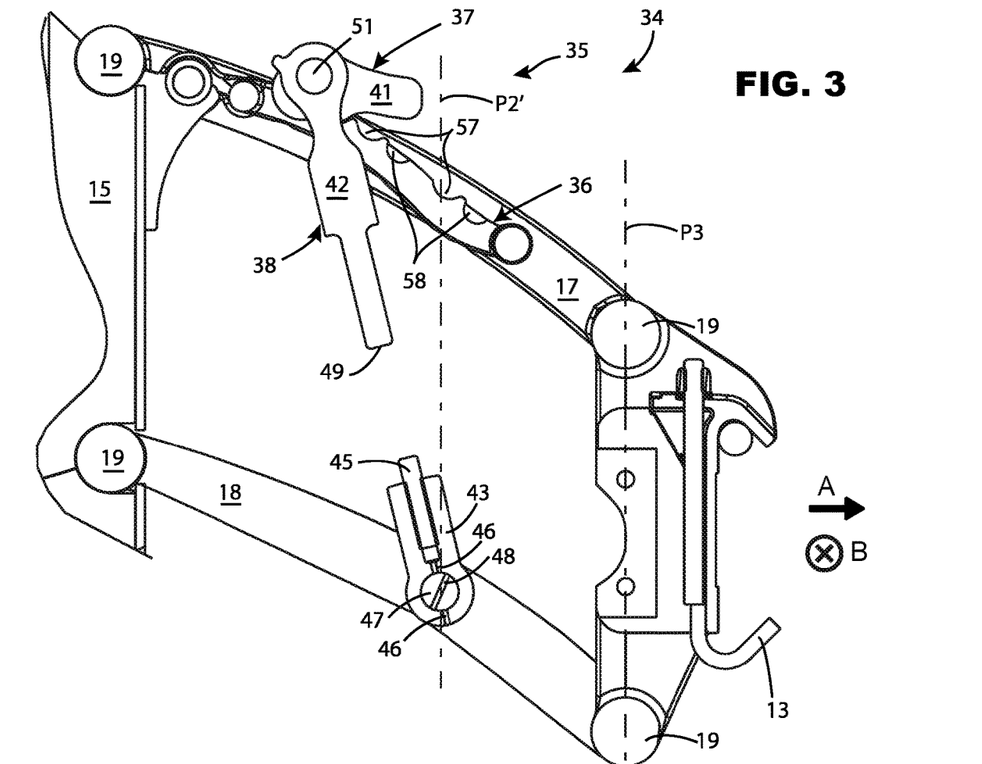
FIG. 3 is a longitudinal sectional view, with partial cutaway, of the elements of FIG. 2.
Figure 4:
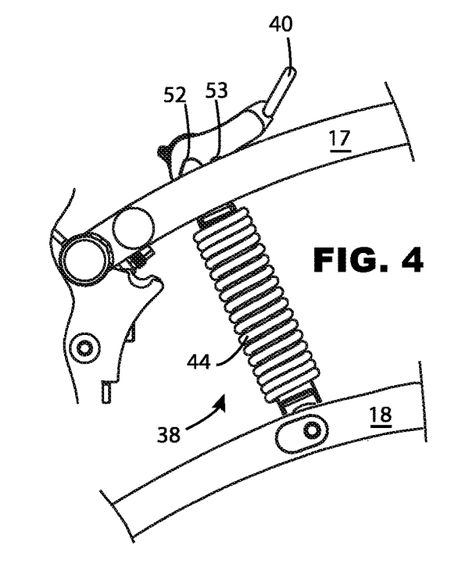
FIGS. 4 and 5 are side views of the elements of FIG. 2, showing the adjusting system respectively in a working position and in an adjusting position.
Figure 5:
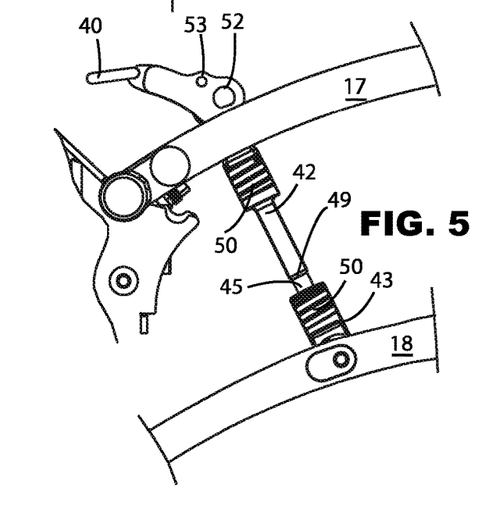

In a first embodiment of the connecting structure 31, the adjusting system 34 has a movable mechanism 35 and a fixed rack 36 (FIGS. 2 and 3).

The movable mechanism 35 has a lever 37 and a resilient member 38. The mechanism 35 is mounted on the lower arms 18 about a lower pivot 47 oriented along an axis 60 with direction B (FIG. 2). The mechanism 35 is generally rotatable in a front-back vertical plane oriented in the direction A. The lever 37 is in turn rotatable relative to the resilient member 38. The lever 37 here is centered relative to the arms 17.

Figure 6:
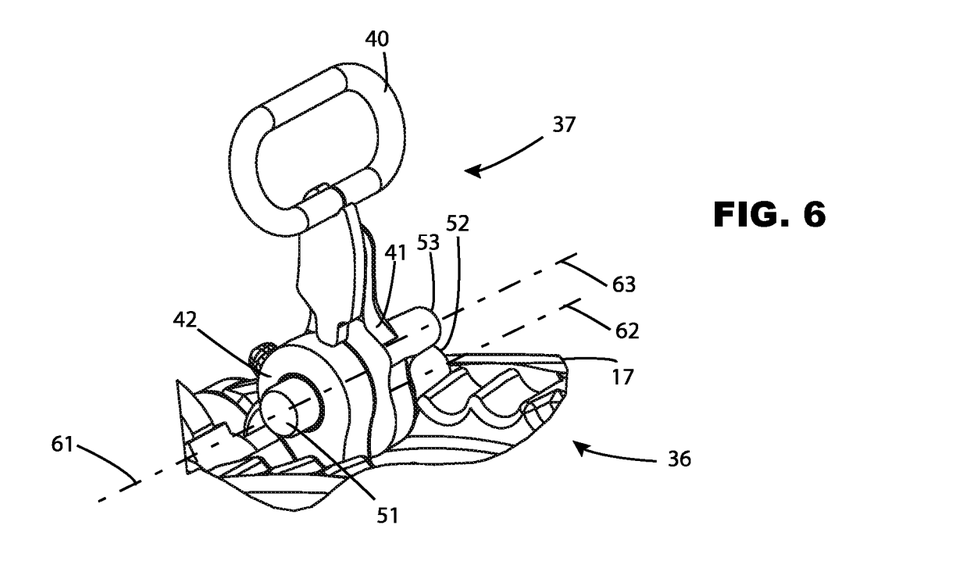
FIG. 6 is a longitudinal sectional cutaway view of a handle of the adjusting system of FIG. 2.

The lever 37 here has a handle 40 and two side flanges 41 (FIG. 6).

In the illustrated example, the handle 40 includes a rod curved on itself in an oval, with a large enough diameter to make it possible to grasp it easily and painlessly. In no case is the invention restricted to the illustrated handle. The handle 40 may alternatively assume the form of a horizontal rod oriented in the direction B, or other forms.

Each flange 41 is provided with a pin 52 and a lug 53 (FIG. 2). The pins 52 and lugs 53 are each oriented along a respective axis 62 or 63 parallel to the direction B. The pins 52 here are larger than the lugs 53 both in terms of length and diameter, since the pins 52 serve as pivots and are called upon to undergo transverse forces. This is not, however, limiting, the lugs 53 also being able to have dimensions equal to the dimensions of the pins 52 or another size.

The resilient member 38 here comprises two supports 42 and 43 in the form of elongate towers, a spring 44 and an adjusting member 45.

The tower 43 is mounted pivoting on the lower arms 18 via a lower pivot 47. In the illustrated embodiment, the tower 43 is traversed lengthwise by a bore 46 which, in a forward position of the adjusting system 34, is aligned with a bore 48 traversing the lower pivot 47.

The spring 44 here is a helical traction spring. It is mounted in a helical groove 50 arranged on an outer surface of each of the towers 42 and 43 (see FIG. 5). The spring 44 tends to bring the towers 42 and 43 closer to one another. The spring 44 here preferably has a rigidity such that it keeps them coaxial at all times.

The adjusting member 45 here is a threaded rod. The rod 45 is mounted in the tower 43, coaxial with the bore 46 (see FIG. 3). The threaded rod 45 is then used as a stop for one end surface 49 of the tower 42 in a deployed state of the lever 37.

The position of the rod 45 here is adjustable by insertion underneath an appropriate tool into the bores 46 and 48 when the latter are aligned. To that end, a notch may advantageously be provided at the end of the rod 45 inserted into the tower 43 and offer engagement for a tool such as a screwdriver.

An upper pivot 51, with axis 61 oriented in direction B, traverses the tower 42 in its upper part and in its width. The pivot 51 connects the tower 42 to the flanges 41 (FIGS. 3 and 6). The pivot 51 allows the lever 37 to rotate relative to the resilient member 38.

The pivot 51 preferably, but non-limitingly, always stays above the upper arms 17 irrespective of the state of the adjusting system 34.

The rack 36 in turn is longitudinally fastened between the upper arms 17. The rack 36 forms a reference member for the movable mechanism 35. The rack 36 has different indentations 57 and 58, here oriented upward, i.e., away from the lower arm 18 or more generally away from the ground. The indentations 57 and 58 are preferably, but non-limitingly, located on an arc of circle centered on the axis 60 of the lower pivot 47 in the adjusting state described below. The indentations 57 serve as a housing for the pins 52 and lugs 53 and match shapes with the pins 52. The configuration of the rack, however, allows some of the indentations 57, deeper than the indentations 58, to accommodate lugs 53. The indentations 58 are shallower and can only accommodate lugs 53. Alternatively, the rack may only comprise similar indentations, such as the indentations 57.

The configuration of the adjusting system 34 is advantageous in that it offers better visibility on the rack than the existing one. It is therefore easier to identify the position in which, or opposite which, the adjusting system 34 is positioned.

The operation of the adjusting system 34 will emerge more clearly from the following, in reference to FIGS. 7a to 7c. The dimensions and angles chosen for these figures are arbitrary, in particular the separation between the various illustrated elements or the length of the arrow F representing the return stress exerted by the spring 44.

As illustrated in FIGS. 7a to 7c and described below, the movable mechanism 35 allows three states:

an engaged state in which it can assume, on the rack 36, one of several working positions or an optional neutral position; in the engaged state, the pins 52 and the lugs 53 are engaged in the rack 36 and block the adjusting system 34 against the connecting structure 31;

an adjusting state in which it can be moved and placed across from one or the other of the working positions;

an intermediate state between the adjusting state and the engaged state.

In FIGS. 7a to 7c, a plane P2 passes through the parallel axes 60 and 62, i.e., it includes the rotation axis 60 of the lower pivot 47 and the axis 62 of the pins 52. A border half-plane P1 of the axis 60 includes the axis 61, i.e., it extends from the rotation axis 60 of the lower pivot 47 and passes through the axis 61 of the upper pivot 51. The axis 61 is called first axis and the axis 62 is called second axis.

As illustrated in FIG. 7a, the lever 37 is preferably lowered toward the front of the machine to cause the adjusting system 34 to reach an engaged state. The adjusting system 34 here is shown in a working position, able to apply a down-pressure to the sowing element 30. More specifically, in this particular working position, the pin 52 is housed in an indentation 57 and the lug 53 in an indentation 58. In other working positions, the pin 52 and the lug 53 are housed in two successive indentations 57.

In this Figure, the half-plane P1 extends in front of the plane P2. In other words, in the engaged position, the pivot 51 (and the axis 61) are on a first side C1 located in front of the plane P2. The return stress F exerted by the spring 44 or more generally the resilient element 38 then automatically keeps the lever 37 in the engaged state, here against the rack 36.

In FIG. 7b, the lever 37 has been raised into an intermediate state in which the lugs 53 have left the indentations 58, while the pins 52 are still engaged in the indentations 57. Two different positions of the axes 61 and 63 are illustrated: one in dotted lines, the other in solid lines.

In the position of the axes 61 and 63 shown in dotted lines, the resilient member 38 is still exerting a return stress F on the lever 37. This stress F evolves when the half-plane P1 evolves about the axis 60 or the axis 61 rotates about the axis 62.

The stress F is maximal when the half-plane P1 is combined with the plane P2, i.e., when the axes 60, 61 and 62 are aligned or when the pin 52 is located between the pivots 47 and 51.

When the half-plane P1 is on a side C2 behind the plane P2, the stress F returns the lever 37 toward the adjusting state. Lastly, the stress F no longer affects the lever 37 when the resilient element 38 reaches an adjusting length D1 that here is a constant minimal reference length.

In the illustrated example, this adjusting length D1 is equal to the separation between the axes 60 and 61 (see FIG. 7b) and is determined by the position of the rod 45 in the tower 43, when the end surface 49 comes into contact with the rod 45. The adjustment of the rod 45 has been described above.

The stop adjustment of the resilient member 38 makes it possible to act on the length D1. It is thus possible to adjust the proximity of the pivot 51 to the plane P2 when the resilient member 38 reaches the length D1 from the intermediate state. A pivot 51 closer to P2 makes it possible to reduce the moment of the stress F applied on the pivot 51 and therefore the force that the user must use to switch the lever 37.

Alternatively, the adjusting length D1 is determined by the minimum length of the spring 44, which may or may not have a solid length. The tower 42 then has no piece against which to abut either because the end of the adjusting rod 45 is withdrawn relative to the retracted position of the spring 44, or because the resilient member 38 has no stop adjusting member.

Between the positions shown in FIGS. 7a and 7b, the separation between the axes 60 and 62 retains a constant length D2 because the switching of the lever 37 is done around the pin 52. On the contrary, the resilient member 38 becomes longer until crossing the plane P2, then retracts until reaching the adjusting length D1.

In FIG. 7c, however, the lever 37 has reached an adjusting state in which the pin 52 and the lug 53 have left the indentations 57 and 58.

Between the positions shown in solid lines in FIGS. 7b and 7c, the separation between the axes 60 and 61 keeps a constant length equal to the adjusting length D1, since this time the lever 37 rotates about the pivot 51.

Since the resilient element 38 has reached the adjusting length D1 below which it can no longer contract, it behaves like a connecting rod. And since neither the pins 52 nor the lugs 53 are engaged in the indentations 57 and 58, it is possible to rotate the resilient element 38 around the pivot 47. The movable mechanism 35 can thus be moved on a connecting structure 31 to another working position or the neutral position.

Thus, to adjust the down-pressure applied on the sowing element 30, it suffices, from a first engaged position, to:
  raise the lever 37 by rotation about the pins 52 (to the intermediate state), then the pivot 51 (to the adjusting state),
  pivot the movable mechanism 35 across from a second desired position, and
  lower the lever 37 by rotation about the pivot 51 (to the intermediate state), then about the pin 52 until the lug 53 is engaged in the rack 36 in a second engaged position.

In practice, once the pin 52 has left the indentation 57 in which it was engaged, the resilient member 38 can begin to tilt from front to back around the axis 60.

The adjusting system 34 further has a particular engaged position, called neutral position, in which it does not apply any down-pressure to the sowing element 30 or at least only applies a negligible pressure in light of the weight of the sowing element. This neutral position is optional. In this position, the plane P2' bearing the axes 60 and 62 is substantially parallel to a plane P3 bearing the pivots 19 located in front of the structure 31, on the side of the clamp 13 (FIG. 3). A corresponding pair of indentations 57 and 58 is therefore provided in front of the rack. These are for example the indentations 57 and 58 furthest to the right in FIG. 3.

It should be noted that in the neutral position, while the adjusting system 34 does not apply a down-pressure, the resilient element 38 is nevertheless powered on. Consequently, the stress F applied on the resilient element prevents bundling of the adjusting system 34 when the seeder 1 is raised.

In an alternative that is not shown, the engaged state is reached by lowering the lever toward the rear of the machine.

In an alternative that is not shown, the adjusting member 45 is mounted on the upper tower 42. The tower 42 is then traversed lengthwise by a bore that is aligned with a bore 48 traversing the lower pivot 47 in a particular position of the adjusting system 34, for example a forward position of the adjusting system 34.

In another alternative that is not shown, the upper pivot 51 can be formed directly in a body with the traction spring. In other words, the upper end of the traction spring forms the upper pivot on which the lever 37 is mounted.

Figure 8:
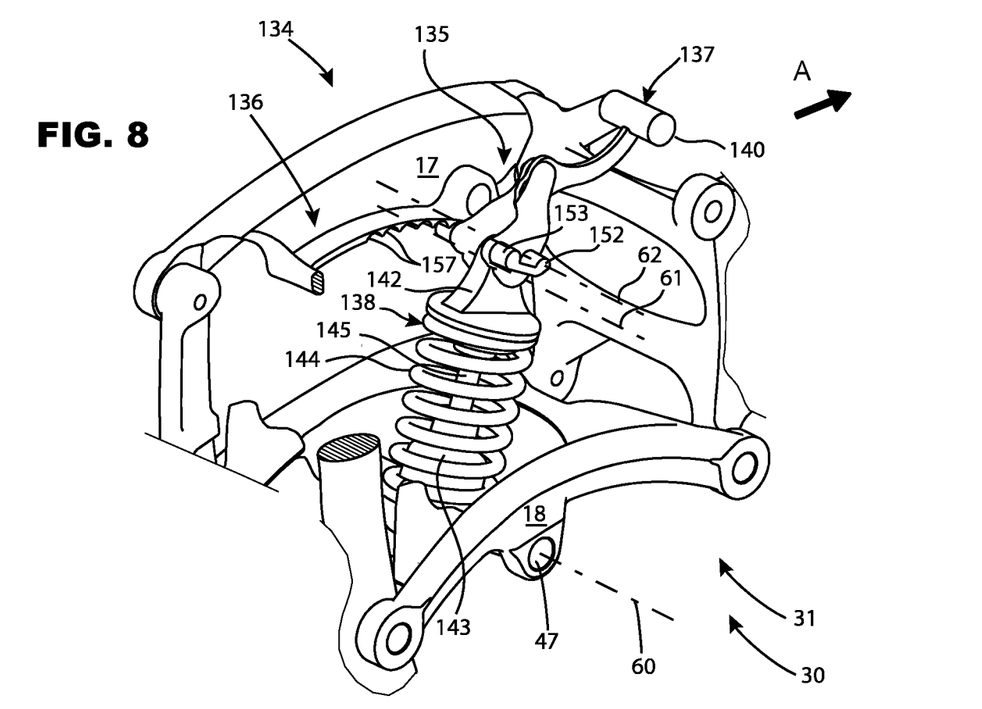
FIG. 8 is a perspective view, with partial cutaway, of a second embodiment of a sowing element connecting structure.
Figure 9:
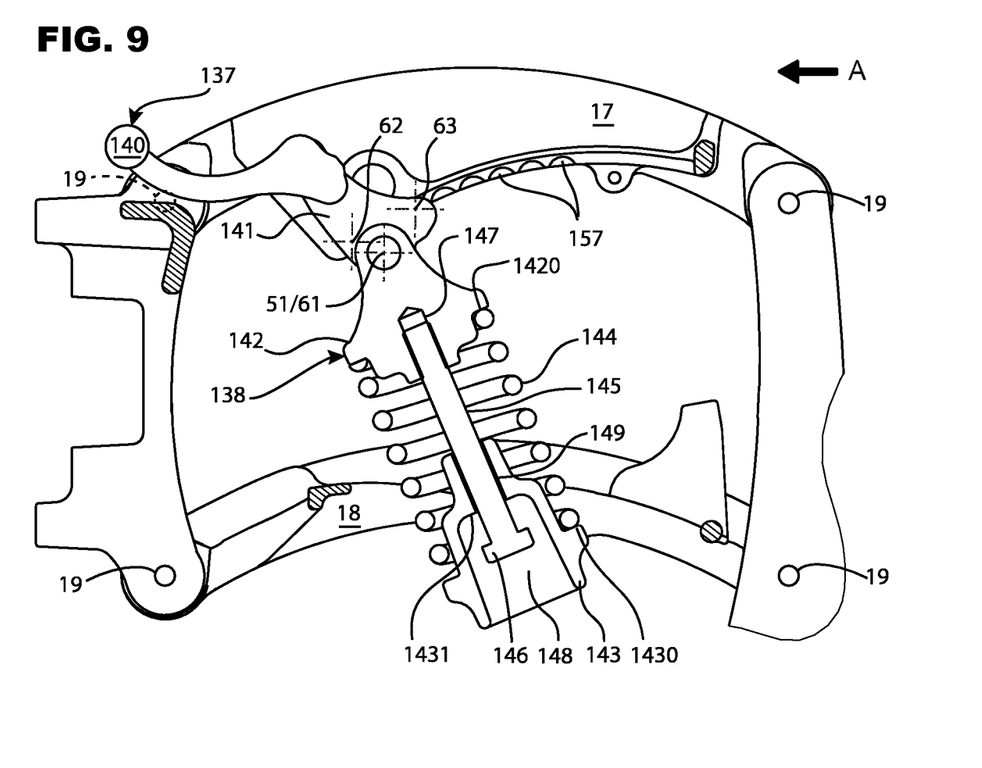
FIG. 9 is a longitudinal sectional view of the elements of FIG. 8.
Figure 10A:
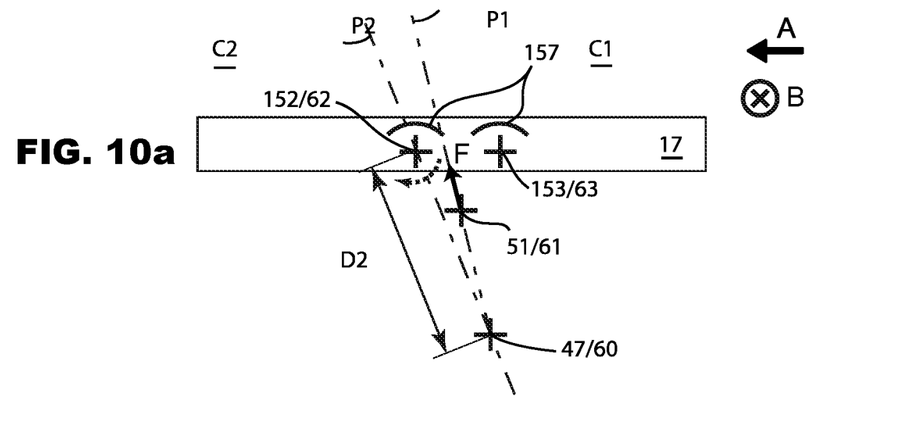
FIGS. 10a, 10b and 10c are diagrams illustrating a pin, a lug and a hinge pin of the adjusting system of FIG. 8 in an engaged state, an intermediate state and an adjusting state.
Figure 10B:
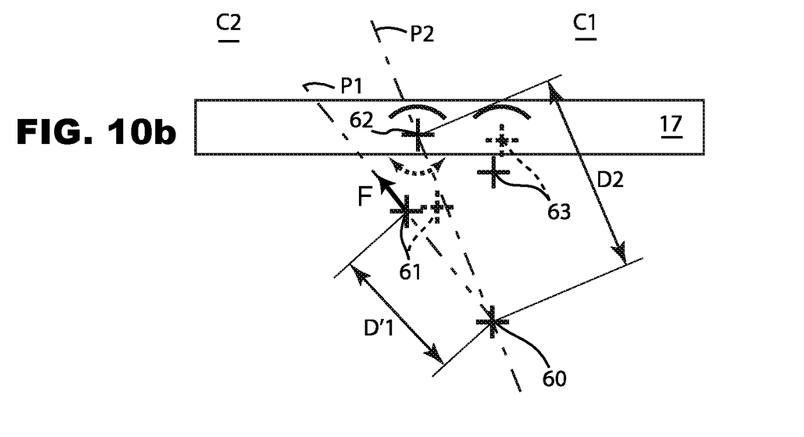
Figure 10C:
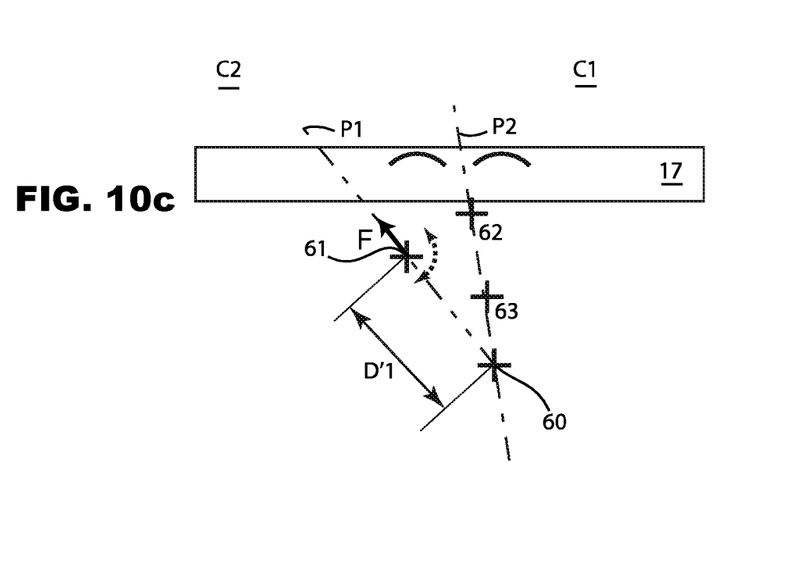

In a second embodiment of the connecting structure 31 shown in FIGS. 8 and 9, and schematically in FIGS. 10a to 10c, an adjusting system 134 includes a movable mechanism 135 and a reference member 136. In the text that follows, the elements that are similar in principle to the elements of the first embodiment bear the same numerical references.

The movable mechanism 135 includes a lever 137 and a resilient member 138. The lever 137 is provided with a handle 140 in bar form, and two side flanges 141. The lever 137 is still accessible from the top of the connecting structure 31, i.e., here above the reference member 136. The flanges 141 are fastened to one another and to the handle 140. The flanges 141 are further mounted pivoting on a support 142 of the resilient member 138 described below by an upper pivot 51 with axis 61 similar to that of the first embodiment.

Similarly to the flanges 41, the flanges 141 each have a pin 152 and a lug 153. While the shapes of the pins 152 and lugs 153 differ slightly from the pins 152 and lugs 153 in that each pin 152 is connected to the adjacent lug 153 by a portion of same height, their role is similar to the pins 52 and lugs 53: the pins 152 serve as pivots on part of the tilting travel of the lever 137, more specifically in the intermediate state, and the lugs 153 form a locking element in the locked state, like in the first embodiment. The pins 152 have, as shared rotation axis, an axis 62, and the lugs 153 have, as shared rotation axis, an axis 63 (FIGS. 8, 9 and 10a to 10c).

The resilient member 138 includes two supports 142 and 143 in the form of elongated towers, a spring 144 and a stop adjusting member 145.

The spring 144 here is a helical compression spring.

The stop adjusting member 145 here is, non-limitingly, a hex head screw; alternatively, the screw head is of another appropriate type, such as a hollow cylindrical head with six faces. Alternatively, the stop adjusting member can assume other forms, for example a system including a set of adjusting shims. The stop adjusting member can also comprise a rod with transverse and through perforations in which an adjusting cotter pin can be inserted.

The tower 142 here has a threaded hole 147 intended to receive the end of the screw 145.

The tower 143 is mounted pivoting on the lower arms 18 via a pivot 47 with axis 60. The tower 143 here is hollow, in the form of a bush having an inner housing 148. In this embodiment, the bottom wall 1431 of the tower 143 is traversed all the way through by a smooth bore 149, i.e., not threaded. The screw 145 is mounted sliding in the bore 149. The bottom wall 1431 forms a stop for the head 146 of the screw 145. The maximum length of the resilient member 138 here is therefore adjustable by screwing and unscrewing the stop adjusting member 145.

The towers 142 and 143 each have a respective planar annular surface 1420 and 1430 forming a bearing for the spring 144. The towers 142 and 143 can each comprise a surface generally transverse to the annular surfaces 1420 and 1430, for example cylindrical or with a helical slot, corresponding to the inner diameter of the spring 144 in its contact zones with the towers 142 and 143.

The maximum separation between the two towers 142 and 143 is adjustable and is determined by the engagement depth of the screw 145 in the threaded hole 147.

The reference member 136 comprised by the movable mechanism 135 is a rack, i.e., a notched bar, similar to the reference member 36 of the first embodiment. However, the indentations 157 comprised by the reference member 136 are oriented downward, i.e., here toward the lower arm (18) or more generally toward the ground. This orientation has the advantage of limiting the retention of soil (dirt, sand, etc.) in the indentations 157, and therefore the dirtying of the connecting structure 31. One thus limits the risk of adjusting flaws related to insufficient pushing in of the pins 152 and lugs 153 in the reference member 136. One also limits the flaking of the paint, which could promote the corrosion of the machine and deteriorate the aesthetics thereof.

By analogy to FIGS. 7a to 7c of the first embodiment, examples of positions of the axes 60 to 63 are illustrated in FIGS. 10a to 10c.

By analogy to the first embodiment, the movable mechanism 135 of the second embodiment allows three states:
an engaged state in which the pins 152 and the lugs 153 are engaged in the rack 136 and lock the adjusting system 134 against the connecting structure 31;
an adjusting state;
an intermediate state between the adjusting state and the engaged state.

In FIGS. 10a to 10c, a plane P2 passes through the parallel axes 60 and 62, i.e., it includes the rotation axis 60 of the lower pivot 47 and the axis 62 of the pins 152. A border half-plane P1 of the axis 60 includes the axis 61, i.e., it extends from the rotation axis 60 of the lower pivot 47 and passes through the axis 61 of the upper pivot 51.

As illustrated in FIG. 10a, the lever 137 here is preferably lowered toward the front of the machine to cause the adjusting system 134 to reach an engaged state. The adjusting system 134 here is shown in a working position, able to apply a down-pressure to the sowing element 30. More specifically, in this particular working position, the pins 152 and the lugs 153 are each housed in an indentation 157.

In this Figure, the half-plane P1 extends behind the plane P2. In other words, in the engaged position, the pivot 51 (and the axis 61) are located on a first side C1 here located behind the plane P2. The return stress F exerted by the spring 144 or more generally the resilient element 138 then automatically keeps the lever 137 in the engaged state, here against the rack 136.

In FIG. 10b, the lever 137 has been raised into an intermediate state in which the lugs 153 have left the indentations 157, while the pins 152 are still engaged in the respective indentations 157. Two different positions of the axes 61 and 63 are illustrated: one in dotted lines, the other in solid lines.

In the position of the axes 61 and 63 shown in dotted lines, the resilient member 138 still exerts a return stress F on the lever 137. This stress F evolves when the half-plane P1 evolves about the axis 60 or the axis 61 rotates about the axis 62.

The stress F is maximal when the half-plane P1 is combined with the plane P2, i.e., when the axes 60, 61 and 62 are aligned or when the pin 152 is located between the pivots 47 and 51.

When the half-plane P1 is on the side C2 located in front of the plane P2, the stress F returns the lever 137 toward the adjusting state. Lastly, the stress F no longer affects the lever 137 when the resilient element 138 reaches an adjusting length D'1 that is a constant maximal reference length in the second embodiment.

In the illustrated embodiment, this adjusting length D'1 is equal to the separation between the axes 60 and 61 (see FIG. 10b) and is determined by the position of the screw 145 in the tower 143, when the bottom wall 1431 comes into contact with the head 146 of the screw 145.

The stop adjustment of the resilient member 138 makes it possible to act on the length D'1. It is thus possible to adjust the proximity of the pivot 51 to the plane P2 when the resilient member 138 reaches the adjusting length D'1 from the intermediate state.

Alternatively, the adjusting length D'1 is determined by the maximal length of the spring 144. The tower 143 then has no piece against which to abut either because the head 146 is beyond the position reached by the tower 143 when the spring 144 is deployed, or because the resilient member 138 is free of stop adjusting members (for example, when the manufacturing precision justifies doing without one).

Between the positions shown in FIGS. 10a and 10b, the separation between the axes 60 and 62 keeps a constant length D2, since the switching of the lever 137 is done about the pins 152 and the force F keeps the pins 152 in the indentation 157. On the contrary, the resilient member 138 retracts until crossing the plane P2, then elongates until reaching the adjusting length D'1.

In FIG. 10c, however, the lever 37 has reached an adjusting state in which the pins 152 and the lugs 153 have left the indentations 157.

Between the positions shown in solid lines in FIGS. 10b and 10c, the separation between the axes 60 and 61 keeps a constant length equal to the adjusting length D'1, since the lever 137 this time rotates about the pivot 51.

Since the resilient element 138 has reached the adjusting length D'1 beyond which it can no longer relax, it behaves like a connecting rod. And since neither the pins 152 nor the lugs 153 are engaged in the indentations 157, it is possible to cause the resilient element 138 to rotate about the pivot 47. The movable mechanism 135 can thus be moved on the connecting structure 31 to another working position or the neutral position.

Thus, to adjust the down-pressure applied on the sowing element 30, it suffices, from a first engaged position, to:
raise the lever 137 by rotation about the pins 152 (to the intermediate state), then the pivot 51 (the adjusting state),
pivot the movable mechanism 135 across from a second desired position, and lower the lever 137 by rotation about the pivot 51 (to the intermediate state), then about the pins 152 until the lugs 153 are engaged in the rack 136 in a second engaged position.

In practice, once the pins 152 have left the indentation 157 in which they were engaged, the resilient member 138 can begin to tilt from front to back around the axis 60.

Alternatively, the lever can be oriented toward the rear in the engaged state of the mechanism.

The invention claimed is:

1. A working element of an agricultural machine, comprising:
   a tool;
   a deformable connecting structure to be mounted on a substantially horizontal beam of the machine to connect the tool to the machine, the connecting structure comprising:
      at least one upper arm;
      at least one lower arm; and
      a down-pressure adjusting system having a movable mechanism and a reference member fixed to the at least one upper arm,
   the movable mechanism comprising a lever and a resilient member pivotally attached to the at least one lower arm, the lever being mounted rotatably relative to the resilient member about a first axis, the movable mechanism allowing:
      an engaged state in which the movable mechanism is held against the reference member, and wherein the movable mechanism can assume at least one working position in which the adjusting system applies a down-pressure to the tool of the working element; and
      an adjusting state in which the movable mechanism is movable relative to the reference member about a lower axis,
   wherein the movable mechanism comprises a second axis different from the first axis,
   wherein the movable mechanism allows an intermediate state in which the lever is rotatable about the second axis, and
   wherein, in the intermediate state, when the first axis is on a first side of a plane passing through the lower axis and through said second axis, the resilient member stresses the lever toward the reference member.

2. The working element according to claim 1, wherein, in the intermediate state, when the first axis is on a second side of a plane passing through the lower axis and the second axis, the resilient member stresses the lever toward the adjusting state.

3. The working element according to claim 1, wherein, in the adjusting state, the resilient member has a constant adjusting length and is rotatable about the lower axis.

4. The working element according to claim 3, wherein a support of the resilient member is provided with a stop adjusting member, the adjusting length of the resilient member being determined by the position of the stop adjusting member.

5. The working element according to claim 4, wherein the support and a pivot each include a bore, the position of the stop adjusting member being adjustable by inserting a corresponding tool into the bores when the latter are aligned.

6. The working element according to claim 1, wherein the resilient member includes a helical spring.

7. The working element according to claim 1, wherein the resilient member includes a helical traction spring with a solid length in the adjusting state of the movable mechanism.

8. The working element according to claim 1, wherein the reference member is a rack comprising indentations oriented upward, away from the lower arm.

9. The working element according to claim 1, wherein the resilient member includes at least one compression spring.

10. The working element according to claim 1, wherein the reference member is a rack comprising indentations oriented downward, toward the lower arm.

11. The working element according to claim 4, wherein the stop adjusting member is a hex head screw, and wherein a wall of the support forms a stop for the head of the hex head screw.

12. The working element according to claim 1, wherein, in the engaged state the movable mechanism can also assume a neutral position in which the movable mechanism is held against the reference member by the resilient element without the system for adjusting the down-pressure applying a down-pressure to the tool of the working element.

13. An agricultural machine comprising:
   the working element according to claim 1.

14. The working element according to claim 1, wherein the tool is a seeder, planter, fertilizer distribution machine, or a mixing machine.

15. A working element of an agricultural machine, comprising:
   a tool;
   a deformable connecting structure to be mounted on a substantially horizontal beam of the machine to connect the tool to the machine, the connecting structure comprising:
      at least one upper arm;
      at least one lower arm; and
      a down-pressure adjusting system having a movable mechanism and a reference member fixed to the at least one upper arm,
   the movable mechanism comprising a lever and a resilient member pivotally attached to the at least one lower arm, the lever being mounted rotatably relative to the resilient member about a first axis, the movable mechanism allowing:
      an engaged state in which the movable mechanism is held against the reference member, and wherein the movable mechanism can assume at least one working position in which the adjusting system applies a down-pressure to the tool of the working element; and
      an adjusting state in which the movable mechanism is movable relative to the reference member about a lower axis,
   wherein the movable mechanism comprises a second axis different from the first axis,
   wherein the movable mechanism allows an intermediate state in which the lever is rotatable about the second axis, and
      wherein the resilient member includes at least one compression spring.

16. A working element of an agricultural machine, comprising:
   a tool;
   a deformable connecting structure to be mounted on a substantially horizontal beam of the machine to connect the tool to the machine, the connecting structure comprising:

at least one upper arm;
at least one lower arm; and
a down-pressure adjusting system having a movable mechanism and a reference member fixed to the at least one upper arm,
the movable mechanism comprising a lever and a resilient member pivotally attached to the at least one lower arm, the lever being mounted rotatably relative to the resilient member about a first axis, the movable mechanism allowing:
an engaged state in which the movable mechanism is held against the reference member, and wherein the movable mechanism can assume at least one working position in which the adjusting system applies a down-pressure to the tool of the working element; and
an adjusting state in which the movable mechanism is movable relative to the reference member about a lower axis,
wherein the movable mechanism comprises a second axis different from the first axis,
wherein the movable mechanism allows an intermediate state in which the lever is rotatable about the second axis, and
wherein the reference member is a rack comprising indentations oriented downward, toward the lower arm.

* * * * *